United States Patent [19]

Fornek et al.

[11] Patent Number: 5,305,312

[45] Date of Patent: Apr. 19, 1994

[54] APPARATUS FOR INTERFACING ANALOG TELEPHONES AND DIGITAL DATA TERMINALS TO AN ISDN LINE

[75] Inventors: Martin J. Fornek, Lisle; Dennis R. Kinn, Geneva; Steven P. Meade, Bolingbrook; Blaine E. Welman, Wheaton, all of Ill.

[73] Assignee: AT&T Bell Laboratories, Murray Hill, N.J.

[21] Appl. No.: 832,269

[22] Filed: Feb. 7, 1992

[51] Int. Cl.[5] .......................... H04J 3/12; H04Q 11/04
[52] U.S. Cl. ........................................ 370/62; 370/79; 370/110.1; 379/88; 379/93
[58] Field of Search ................... 370/55, 58.1, 58.2, 370/58.3, 62, 79, 110.1, 110.2, 110.3; 379/88, 89, 93, 94, 97, 98, 387, 399, 413, 201

[56] References Cited

U.S. PATENT DOCUMENTS

| | | | |
|---|---|---|---|
| 4,585,904 | 4/1986 | Mincone et al. | 379/93 |
| 4,718,057 | 1/1988 | Venkitakrishnan et al. | 370/55 |
| 4,905,237 | 2/1990 | Voelzke | 370/110.1 |
| 4,922,484 | 5/1990 | Yoshida et al. | 370/110.1 |
| 4,922,490 | 5/1990 | Blakley | 370/110.1 |
| 4,961,185 | 10/1990 | Sawada | 370/110.1 |
| 5,067,125 | 11/1991 | Tsuchida | 370/79 |
| 5,113,396 | 5/1992 | Kagami | 370/110.2 |
| 5,134,611 | 7/1992 | Steinka et al. | 370/79 |

FOREIGN PATENT DOCUMENTS

58713/90  6/1990  Australia .

Primary Examiner—Benedict V. Safourek
Assistant Examiner—Alpus H. Hsu
Attorney, Agent, or Firm—Michael B. Johannesen

[57] ABSTRACT

An interface to an integrated service, digital network (ISDN) line for up to two analog dual tone, multifrequency telephones and up to four personal computers or data terminals. A stored program-controlled processor controls access to the ISDN line for the analog and digital interface circuits. The processor also provides access to switch-controlled ISDN features for the analog telephones (e.g., call waiting, call hold, etc.).

14 Claims, 6 Drawing Sheets

5,305,312

APPARATUS FOR INTERFACING ANALOG TELEPHONES AND DIGITAL DATA TERMINALS TO AN ISDN LINE

TECHNICAL FIELD

This invention relates to integrated services digital network (ISDN) customer premise equipment, and more specifically to an apparatus and method for interfacing one or more analog telephone station sets and/or one or more digital data terminals to an ISDN line.

BACKGROUND OF THE INVENTION

Integrated services digital network (ISDN) switching systems are now being deployed around the world, making new features and services available to customers and providing voice and data communication through a single line into the customer premises. Customer acceptance of ISDN is somewhat slow, due in part to the cost of new equipment needed to use ISDN services. A customer cannot plug an analog telephone into an ISDN line and receive telephone services. Likewise, a customer cannot plug a personal computer or other digital data terminal directly into an ISDN line and receive data services. Part of the problem is the nature of ISDN transmission.

According to ISDN standards as set forth by the International Telegraph and Telephone Consultative Committee (CCITT), ISDN customer premises equipment communicates with ISDN switching systems in two 64 kilobits per second (kbps) channels, referred to as B-channels, and in one 16 kbps per second channel referred to as a D-channel. Each of the B-channels is usable to convey digitized voice samples at the rate of 8,000, 8-bit samples per second or data at a rate of 64 kbps. The D-channel is used both to convey signaling packets to effect message signaling between ISDN stations and to convey data packets among ISDN stations.

One system for transmission between ISDN customer premises equipment and the ISDN switching system uses a 4-wire, digital subscriber line (DSL). A 4-wire DSL conveys a serial bit stream at the rate of 192 kbps, which comprises 144 kbps, for the above-mentioned two 64 kbps B-channels and one 16 kbps D-channel and which further comprises 48 kbps used for a number of functions including framing, DC balancing, control and maintenance. A 4-wire DSL represents what is referred to by International Telegraph and Telephone Consultative Committee (CCITT) as the T-interface.

Customers connecting to the T-interface require either a special telephone, (such as the AT&T 7500 series of telephones), to which the customer may connect the serial port of a personal computer, or a special board in a personal computer, (such as an AT&T Personal Computer Terminal Adapter) to which the customer may connect a standard analog telephone. Both of these alternatives are relatively expensive, require special knowledge to set up, and may require that the telephone network between the ISDN switching system and the customer premises be rewired from a 2-wire to a 4-wire network.

CCITT recommendations also recognize a U-interface, which provides ISDN service using a 2-wire DSL. This 2-wire DSL transmits a serial bit stream at the rate of 80 kbps where each bit conveys four levels of information, yielding an effective data rate of 160 kbps, thus providing two 64 kbps B-channels, one 16 kbps D-channel, and signaling and maintenance information. The advantage of the U-interface is that the local telephone network does not require rewiring. Neither a standard analog telephone nor a digital data terminal can connect directly to a 2-wire DSL. Additionally, a further piece of customer premises equipment, a network interface, is required to provide 2 to 4 wire conversion and the associated data rate conversion. The network interface is then connected to the above-discussed special telephone or special personal computer board.

Therefore, a problem in the art is that there is no inexpensive apparatus for providing a plug-in and use interface to an ISDN digital subscriber line for both analog telephones and digital data terminals.

SUMMARY OF THE INVENTION

This problem is solved and a technical advance is achieved in the art by an exemplary apparatus that provides a plug-in interface for analog telephones and digital data terminals in one small, inexpensive box, connected to an ISDN line comprising two B-channels and a D-channel. The apparatus comprises a stored program control processor, an analog interface connected to an ISDN line for interfacing analog telephones to one or more B-channels of the ISDN line under the control of the stored program control processor, and a digital interface connected to the ISDN line for interfacing a digital data terminal to either the D-channel or a B-channel under control of the stored program control processor. Advantageously, the apparatus of this invention includes an interface transceiver for providing a U-interface between the apparatus and the ISDN line. The apparatus may comprise two analog interfaces and two digital interfaces to provide ISDN service for up to two analog telephones and four digital data terminals. Additionally, an ISDN communications controller is provided to receive and transmit signaling and maintenance messages between the switching system and the processor.

Brief Description of the Drawing

A more complete understanding of the invention may be obtained from a consideration of the following description in conjunction with the drawings in which.

Detailed Description

Figure 1:
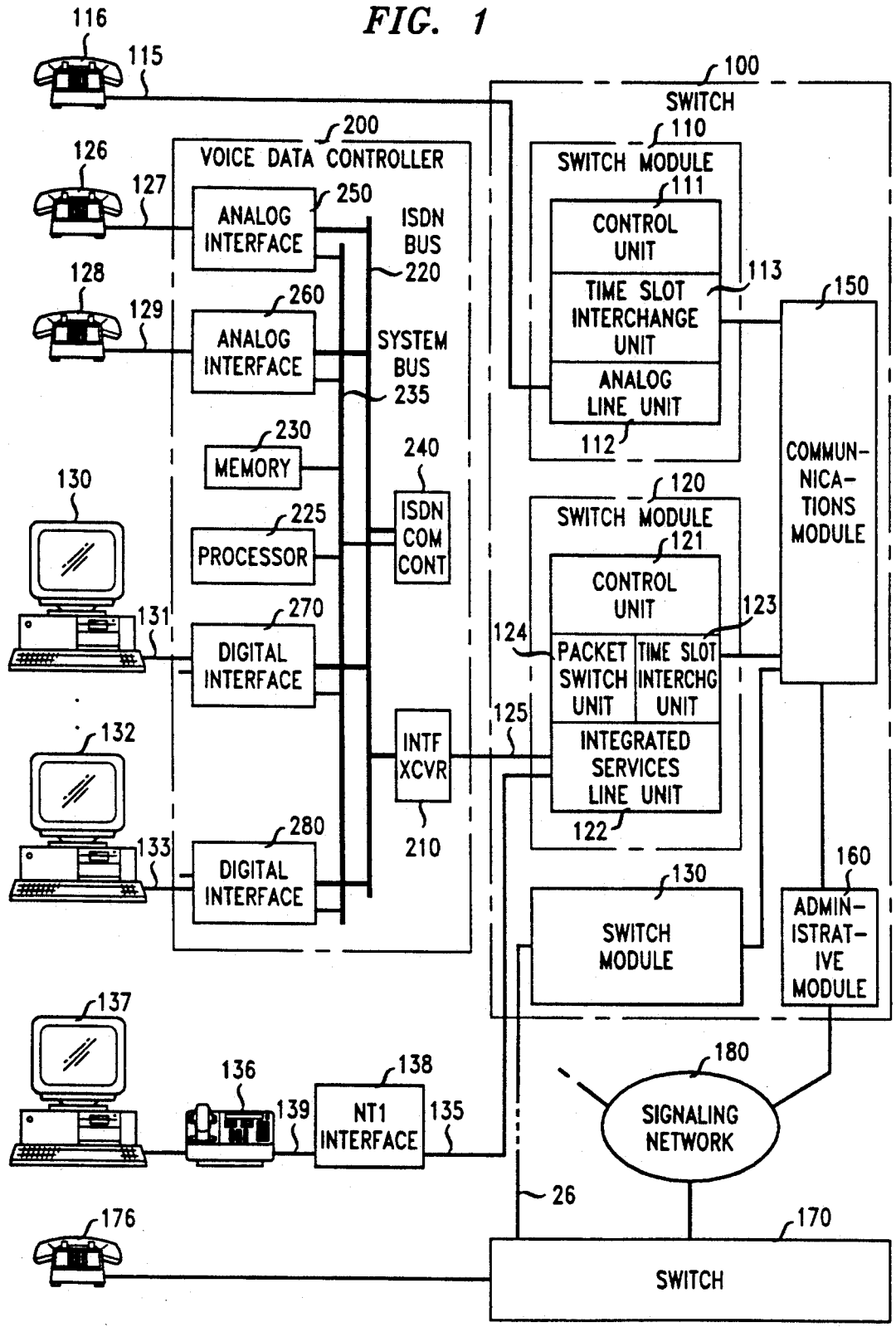
FIG. 1 is a block diagram illustrating the principles of this invention embodied in a voice/data controller in the context of a telephone switching network.

An exemplary voice/data controller is described herein in the context of the switching network configuration of FIG. 1, having two central office switches, 100 and 200, an inter-switch signaling network 250, e.g. a common channel signaling (CCS7) network 180 and illustrative communication stations including conventional analog stations 116 and 126, an integrated services digital network (ISDN) station 136 and a personal computer 137. Switches 100 and 200 are interconnected by a communication path 26, which may include intermediate switches.

Illustratively, switch 100 is a distributed control, ISDN switching system such as the system disclosed in U.S. Pat. No. 4,592,048, issued to M. W. Beckner et al., on May 27, 1986. An integrated services digital network (ISDN) is a network that provides end-to-end digital connectivity to support a wide range of services, including voice and non-voice services, to which users have access by a limited set of standard multipurpose customer interfaces. Switch 100 includes a number of switching modules (SMs), each associated with a different subset of stations or trunks. Each switching module includes a control unit for controlling connections to and from its associated station or trunks.

The architecture of switch 100 has communication module (CM) 150 as a hub, with the switching modules (SMs) 110, 120, and 130, and an administrative module (AM) 160 emanating therefrom. Switching module 110, for example, includes control unit 111 for controlling connections to and from station 116. Similarly, switching module 120 includes control unit 121 for controlling connections to and from telephone station set 126.

Switching module 120 includes an integrated services line unit (ISLU) 122, which terminates the digital subscriber lines, e.g., 125 and 135, and provides access to a time slot interchange unit (TSIU) 123 and a packet switching unit (PSU) 124. TSIU 123 and PSU 124, respectively, provide circuit and packet switched connections to and from the associated stations under control of control unit 121. Switching module 110 includes an analog line unit (ALU) 112 which terminates conventional analog lines, e.g., 115, and provides access to a TSIU 113. TSIU 113 provides circuit-switched connections to and from the associated stations 116 under control of control unit 111.

Switching module 130 is similar to switching modules 110 and 120, but includes the appropriate analog or digital trunk unit (not shown) for interfacing with the outgoing trunk included in communication path 26 to switch 170.

A prior art ISDN telephone station set 136 and associated personal computer 137 are connected to ISLU 122 via 2-wire digital subscriber line (DSL) 135. An NT1 interface 138 is required to perform two to four wire conversion and perform data rate adaptation between DSL 135 and ISDN telephone 136. Information is conveyed between ISDN station 136 and NT1 138, using a 4-wire, digital subscriber line (DSL) 139. As stated previously, DSL 139 transmits a serial bit stream at the rate of 192 kilobits per second, which comprises 144 kilobits per second, for the above-mentioned two 64 kilobits per second B-channels and one 16 kilobits per second D-channel and which further comprises 48 kilobits per second used for a number of functions including framing, DC balancing, control and maintenance. Signaling packets are conveyed between ISDN stations and the switching module control units enclosed in level 2 (link-level) frames, for example, in accordance with the standard Link Access Protocol D (LAPD). The exemplary signaling message used for the control of circuit-switched calls are in accordance with CCITT recommendation Q.931.

The relative disadvantage of this system is that only one telephone station set and one data terminal may be supported by NTI 138 and DSL 135. Additionally, NTI 138 and telephone station set 136 are special equipment that the customer must purchase and install on premises. The NTI 138 may require special wiring, and both pieces may be relatively expensive.

Returning now to switch 100, communications module 150 includes a time-shared space-division switch or time-multiplexed switch, that provides 64 kilobits per second circuit switched paths between switching modules. It supports B-channel traffic between switching modules as well as packet traffic between PSUs in different switching modules. The switching module control unit provides call processing and overall control and maintenance functions for the switching module. Switching module control units in different switching modules communicate with others and with the administrative module 160 through a message switch (not shown) in communications module 150 using an internal message protocol.

The architecture provides flexibility in placing specific processing functions in specific processing elements. The general strategy is to place much of the required processing capability in the switching module control units, but to reserve the administrative module for those functions that are inherently centralized. The call processing functions can, for example, be distributed in a number of ways. In one alternative, most of the call processing functions are placed in the switching module control units with routing, terminal hunting, and path hunt functions located in the administrative module. In another alternative, all call processing functions are placed in the switching module control units, with the administrative module reserved for truly administrative processing.

To complete the description of FIG. 1, switch 170 is shown connected to a conventional analog station 175, used for purposes of illustration, as the originating station in the examples described herein. The architecture of switch 170 and the types of stations served by switch 170 are not important to the present invention and are thus not described further.

The system for providing analog telephone and digital data interfaces to an ISDN line may be achieved in a first embodiment in connection with a voice/data controller 200. Voice/data controller 200 is not to scale in this drawing so that the internal components may be illustrated. In the preferred embodiment, all components of voice/data controller 200 comprise commercially available integrated circuits, and is approximately the size of an external modem as known in the art. Therefore, voice/data controller 200 comprises a small, inexpensive interface between currently available analog telephones and personal computers and ISDN digital subscriber lines.

Voice/data controller 200 is connected to switch 100 via 2-wire DSL 125 at interface transceiver 210. Interface transceiver 210 provides two-to-four wire conversion (U-interface to T-interface conversion) and the associated data rate conversion. The output of interface transceiver 210 is connected to ISDN bus 220. ISDN bus 220 provides two B-channels and one D-channel to the components of voice/data controller 200.

Voice/data controller 200 is under control of processor 225. Processor 225 is a stored program control processor, with its program stored in memory 230. Processor 225 controls the various functional blocks of voice/- data controller 200 via control signals on a system bus 235 and on ISDN bus 220.

Signaling messages between switch 100 and processor 225 are received at ISDN communications controller (ICC) 240, which performs a translation and notifies processor 225. Processor 225 receives the signaling message from ICC 240 and responds accordingly. When processor 225 needs to alert or signal switch 100, processor 225 notifies ICC 240, which formats an ISDN signaling message and sends it on ISDN bus 235 through interface 210 to switch 100.

Voice/data controller 200 is connected to analog telephones 126 and 128 via tip-ring pairs 127 and 129, at analog interface 250 and 260, respectively. Analog interface 250 and 260 provide ringing, DTMF detection, coding and decoding (codec) of the analog signal, and other functions as will be described below in connection with FIG. 2. Analog interfaces are also connected to ISDN bus 220 and are under the control of processor 225 via system bus 235 and ISDN bus 220. Alternatively, only one analog interface may be provided which may serve one or two telephones without departing from the scope of this invention.

Digital data terminals are represented by personal computers 130 and 132, but may also be display terminals, file servers, or other digital data devices as known in the art, or hereafter invented. Digital data terminals 130 and 132 are connected by RS-232 serial lines 131 and 133 to voice/data controller 200 at digital interface 270, and 280, respectively. Each digital interface of the preferred embodiment may support two digital data terminals.

In the preferred embodiment of this invention, switch 100 is provisioned as if DSL 125 supports four separate terminals, each having a voice and data capability. Since ISDN has only two B-channels, only two analog telephone may be used simultaneously in this preferred embodiment. However, since switch 100 provisions voice/data controller 200 as if it were four terminals, two telephone numbers can be provisioned for each of the two telephones, each number may then be associated with a distinctive ring tone or pattern.

In this exemplary embodiment, a voice call may be made from, for example, telephone station set 176 to telephone 126, and, simultaneously a voice call may be placed from telephone 116 to telephone station set 128. In this example, telephone 176 goes off-hook and the telephone number of telephone 126 is dialed. Switch 170, upon receiving the dialed digits from telephone station set 176, sends a message via signaling network 180 to switch 100. Switch 100 receives the message at its administrative module (AM) 160 and determines whether telephone station set 126 is busy. If telephone station set 126 is not busy, AM 160 selects a trunk connecting switch 170 with SM 130 and sends a message back to switch 170, including the trunk ID. AM 160 also causes a path to be set up through switch 100 from SM 130 to SM 120 via CM 150.

In response, SM 120 sends a set up message to voice/-data controller 200. The setup message is received at voice/data controller 200 at interface 210 and is received by ICC 240. ICC 240 notifies processor 225, which causes analog interface 250 to be set up for the call. Simultaneously, processor 225 causes ringing to be applied through tip-ring pair 127 to telephone 126. When off-hook is detected at analog interface 250, analog interface 250 notifies processor 225 and processor 225 causes ICC 240 to send a signaling message to SM 120. SM 120 notifies AM 160, which forwards the message to switch 170 and a call path is completed.

Simultaneously, the user of telephone 116 may dial the telephone number of telephone station set 128. ALU 112 of switch module 110 detects off-hook and collects digits. Control unit 111 determines that the call is an interoffice call and causes the path to be set up through TSIU 113, CM 150, and TSIU 123 to ISLU 122. Control unit 121 sends a signaling message to voice/data controller 200 through interface 210, which is received at ICC 240. ICC 240 notifies processor 225, which alerts analog interface 260 and simultaneously applies ringing through tip-ring pair 129 to telephone 128. When off-hook is detected in analog interface 260, processor 225 is notified, which removes ringing and sends a message to control unit 121, which then causes a circuit to be completed to telephone station set 116.

In another exemplary call scenario, while a call is stable between telephone station set 176 and telephone 126, the user of telephone 116 could call telephone 126. In this example, ALU 112 forwards collected digits to control unit 111 as before and control unit 121 is notified. Control unit 120 sends a message via ISLU 122 to voice/data controller 200 through interface circuit 210. The message is received at ICC 240 and processor 225 is notified. Processor 225 determines through an internal status table or other means that telephone 126 is busy. In this instance, processor 225 causes analog interface 250 to generate a call waiting tone audible at telephone station set 126. The user of telephone station set 126 then has the option of flashing the switch hook, which is detected by analog interface 225, which would then notify processor 225 of the flash. Processor 225 causes ICC 240 to send a message to SM 120 requesting the first call to telephone 176 put on hold and the call from telephone 116 connected through to telephone 126. The user of telephone 126 may then converse with the user of telephone 116, or, through flashing the switch hook again (which would be detected by analog interface 250) may cause a conference bridge to be established as is known in the art. Alternatively, by flashing switch hook signaling analog interface 250 notifies processor 225 which causes a message to be sent from ICC 240 to cause control unit 121 to change from one call to the other, as is known in the art.

An outgoing call may be placed from telephone 126 by telephone 126 going off-hook. Off-hook is detected by analog interface 250 which notifies processor 225 via system bus 235. Processor 225 causes ICC 240 to format and send a signaling message to SM 120. In response to the message, control unit 121 of SM 120 causes ISLU 122 to send dial tone through line 125, interface 210, and ISDN bus 220. Analog interface 250 receives dial tone, performs digital-to-analog conversion, and provides dial tone through tip-ring pair 127 to telephone 126. The user of telephone 126 then dials digits which are collected at the analog interface 250. Analog interface 250 informs processor 225 of the dialed digits, which are then forwarded to SM 120. The call is then completed through the system in the normal fashion.

A data call may be made from terminal 130, for example, to terminal 137. A message would be sent from data terminal 130 via serial bus 131, using RS 232 protocol. Alternatively, bus 131 could be a parallel bus. Digital interface 270 receives the request for connection from terminal 130 and sends a message to processor 225 via system bus 235, including the address (telephone number) of the destination. Processor 225 sends a message via ICC 240 to SM 120 to initiate the call. After the call has been initiated, SM 120 sends a message back to processor 225 and processor 225 begins packet transfer, as will be discussed further below.

As stated above, in the preferred embodiment, each analog interface 250 and 260 has two telephone numbers assigned to it. Processor 225 could cause a different ringing sequence or signal to be sent, depending on which number is ringing, and there also may be a plurality of call waiting and other call indicator tones to indicate which number is waiting and which number is active.

Digital interface 270 and 280 may use the B-channels of the ISDN interface in order to have a higher data transfer rate. In this manner, digital interface 270 and 280 would be acting as a modem. However, as each B-channel is being used, the associated voice channels may not be used to telephone station set 126 and 128.

Figure 2:
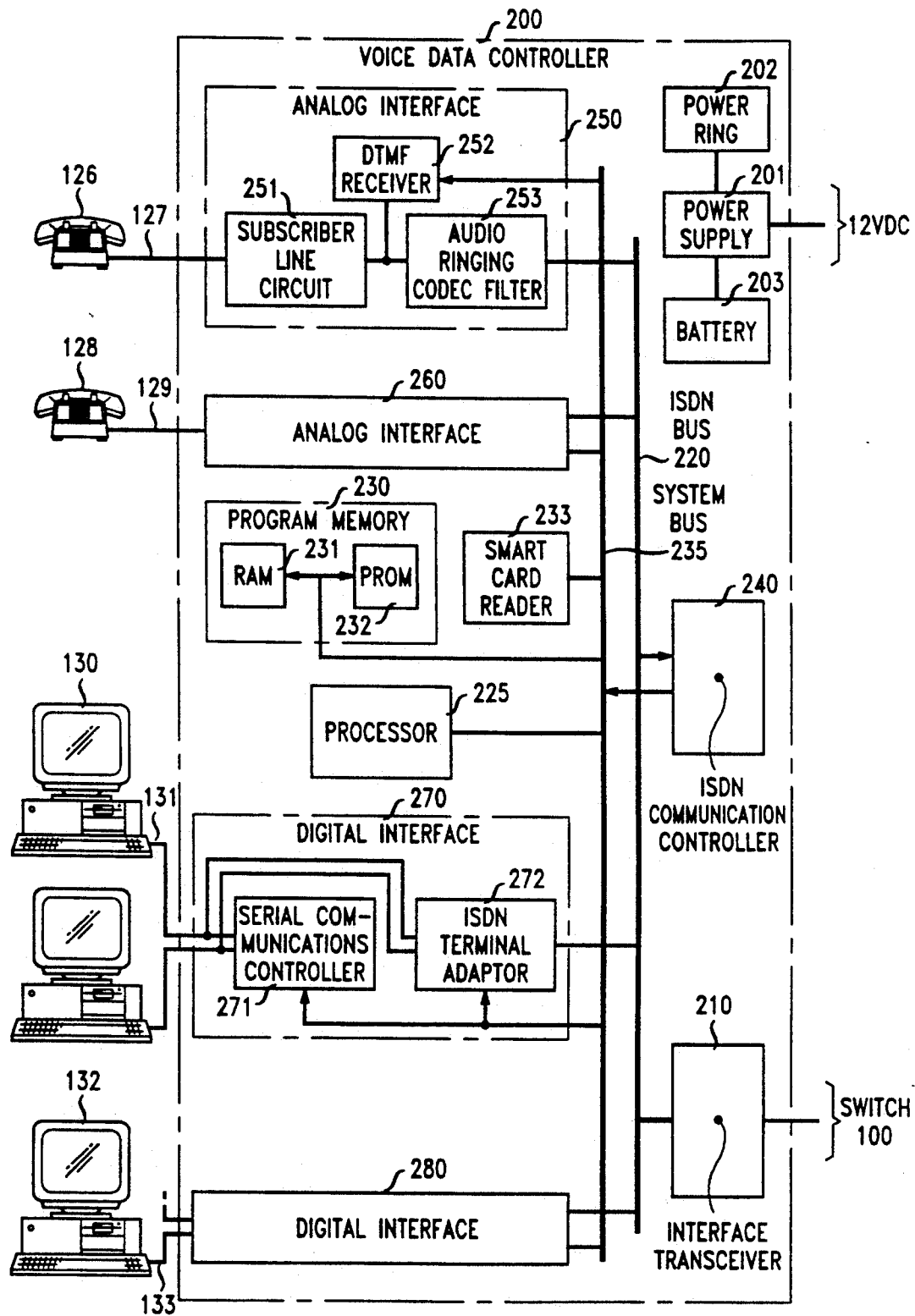
FIG. 2 is a block diagram of the voice/data controller of FIG. 1 according to the preferred embodiment of this invention.

FIG. 2 shows a more detailed functional block diagram of the voice/data controller 200 according to the preferred embodiment of this invention. Power is supplied to voice/data controller 200 by a 120 VAC to 12 VDC wall converter, as is known in the art, and therefore not shown in this drawing for clarity. The 12 VDC supply is delivered to power supply 201 which in turn regulates and modifies the voltage into +5 VDC, −5 VDC, +12 VDC, and −48 VDC, as is known in the art, and required to operate the various integrated circuits and other components in voice/data controller 200. Connections of the power supplies to the various components is well known in the art and is, therefore, not shown in this drawing for clarity.

High voltage power which is required for ringing (+75 VDC and −75 VDC) is supplied by power ringing circuit 202. Power ringing circuit 202 is enabled by processor 225 whenever ringing is to be delivered to telephone station set 126 and/or 128. A power supply lead from power ring 202 to analog interface 250 and 260 is not shown for clarity, but is well known in the art.

Operation of analog telephones 226 and 228 is expected during periods where electrical distribution has been interrupted. Therefore, a battery circuit 203 is included to provide power to the voice/data controller 200 when there is no external AC power. In the preferred embodiment of this invention, battery 203 will supply power for up to approximately four hour, during which time calls from analog telephones 126 and 128 may be placed or received. Because ringing requires more power, this time may be shorter when numerous calls are received, or when a number of calls are placed, or the duration of calls is lengthy. Battery 203 in the preferred embodiment of the invention is a nickel cadmium battery charged by both a trickle charger (when the battery is at or near full charge) and a quick charger (when the battery has run down), as are both known in the art.

Interface transceiver 210 comprises a 2B1Q U-interface, which complies with American National Standards Institute (ANSI) recommendation T1.601-1988 for 2B1Q data transmission. The preferred embodiment comprises a Siemens PEB2091 U-interface transceiver. Interface transceiver 210 can communicate with switch 100 on two wire loops of up to 18,000 feet. Interface transceiver 210 also includes adaptive echo cancellation and digital filtering. Interface transceiver 210 provides primary lightening protection and overload protection, as known in the art. Interface transceiver 210 receives data from, and delivers data to, ISDN bus 220.

ISDN bus 220 is connected to ISDN communication controller (ICC) 240. ICC 240 controls traffic on ISDN bus 220 and transmits control messages between processor 225 and the analog interfaces 250 and 260. In the preferred embodiment of this invention, ICC 240 comprises a Siemens PEB2070. ICC 240 is connected to processor 225 via system bus 235. ICC 240 receives and decodes D-channel communication from ISDN bus 220, and sends control packets to processor 225. Conversely, processor 225 can send control packets to switch 100 via ICC 240.

Processor 225, which generally controls voice/data controller 200, comprises, in the preferred embodiment of this invention, an INTEL80C188 microprocessor. Processor 225 is connected to program memory 230 for storage of operation code and for scratch-pad memory. Memory 230 comprises RAM 231 and programmable read only memory (PROM) 232. In the preferred embodiment, scratch-pad RAM 231 comprises 128 Kb of static RAM. Alternatively, up to 256 Kb static RAM may be used. RAM 231 is used to store current status of the devices attached to voice/data controller 200 and other information in the preferred embodiment of this invention.

Operational code for processor 225 is stored in PROM 232. In the preferred embodiment of this invention, PROM 232 is electronically erasable, programmable read only memory (EEPROM) comprising a 128 Kb or 256 Kb EEPROM. EEPROM was selected for the preferred embodiment of PROM 232 because it may be updated or reprogrammed via a memory card socket 233. When a memory card, or "smart" card, is inserted into socket 233, processor 225 detects its presence and power enables power to PROM 232 and the memory card is read by processor 225 into EEPROM 232, as is known in the art. Alternatively, PROM 232 may be replaced by read only memory (ROM), a floppy disk drive (such as a 3.5 inch floppy disk drive), or a hard disk system. Additionally, PROM 232 may be connected to system bus 235 and updated via packet communication from switch 100.

The operation of analog interface 250 and analog interface 260 is identical and, therefore, only analog interface 250 is shown in detail. Analog interface 250 provides battery, over-voltage protection, ringing, supervision, coding/decoding, hybrid, and testing functionality (BORSCHT functions), as is known in the art, for interfacing analog telephone 126 to a digital system. Telephone 126 is connected to analog interface 250 via tip-ring pair 127 at subscriber line circuit 251. Subscriber line circuit 251 in the preferred embodiment is a Harris HC5502B subscriber line integrated circuit. Subscriber line circuit 251 is electrically connected to power supply 201 and power ringing 202 and provides battery feed and ringing via tip-ring pair 127 to telephone 126. Subscriber line circuit 251 also contains internal switch-hook detecting circuitry and reports on-hook and off-hook transitions to processor 225. Subscriber line circuit 251 provides over-current protection, over-voltage protection during ringing, conversion from the tip-ring interface (two wire) to an input for coding and decoding (four wire) and signal amplification.

Connected to subscriber line circuit 251 is dual tone multifrequency (DTMF) receiver 252. DTMF receiver 252 comprises, in the preferred embodiment, a Motorola MC145436 DTMF tone decoder. DTMF receiver 252 receives DTMF signals from telephone 126, translates the digits and reports received digits to processor 225 via system bus 235. DTMF receivers such as DTMF receiver 252 are well known in the art and, thus will not be described further.

Also connected to subscriber line circuit 251 is audio ringing codec filter 253. In the preferred embodiment of this invention, audio ringing codec filter 253 is an ARCOFI ®, which is a registered trademark and a product of the Siemens Company. Audio ringing codec filter 253 provides coding of the analog signal into digital data and decoding of digital data into an analog signal, as is known in the art. The encoded signal is then placed on the ISDN bus 220 on either of the two B-channels. Processor 225 controls audio ringing codec filter 253 by sending a message to ICC 240 via 235, which translates the message and places it on ISDN bus 220. Audio ringing codec filter 253 also includes a tone and warble generator to provide audible tones to analog telephone 126.

Voice/data controller 200, in the preferred embodiment, supports up to four RS-232C asynchronous serial ports. Each of digital interface 270 and 280 supports two serial ports, wherein digital interface 270 and 280 are identical. Hence, only digital interface 270 will be described. A terminal such as terminal 130 may use voice/data controller 200 in a packet data mode or in a circuit switched data mode, each of which will be described below.

In the packet data mode, both ports on digital interface 270 are controlled by a single serial communication controller 271, which in the preferred embodiment, is a Z85C30 dual serial communications controller, manufactured by the Zilog Corporation. Each of the two ports in the serial communications controller 271 is configured as a separate data packet address.

The output of serial communications controller 271 is connected to the system bus 235 and sent to processor 225. Packetization of incoming data from serial communications controller 271 is performed by processor 225. Processor 225 then delivers these packets to ICC 240 for communication to switch 100 via the D-channel. Reception of data packets from the D-channel operates in the reverse manner.

Alternatively, ISDN terminal adapter 272, when directly connected to data terminal 130, acts as a modem for circuit-switched data calls. In this manner, a baud rate of 38,400 bps is supported. When used in this fashion, only one data terminal may operate through the ISDN terminal adapter 272 at a time, and voice calls to the associated analog telephone will receive a busy signal. The other data terminal connected to serial communication controller 271 may place packet data calls via the D-channel and the other data terminals and the other analog station set is unaffected.

Figure 3:
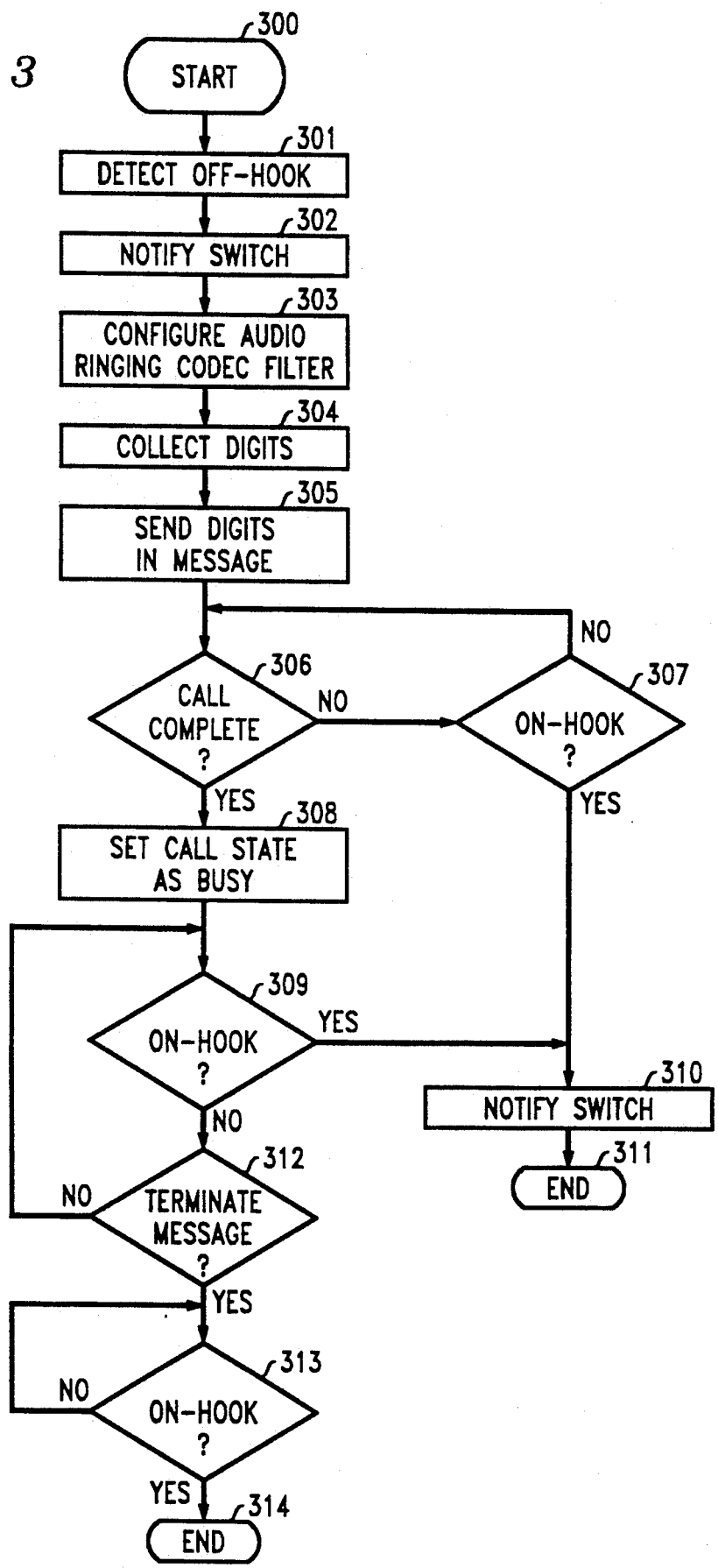
FIG. 3 is a flow chart describing the program control of the voice/data controller of FIG. 2 for a call origination.

FIG. 3 shows a flow chart for the actions taken by processor 225 (FIG. 2) in response to a user placing a telephone call from either telephone 126 or telephone 128. Processing begins at circle 300 and proceeds to box 301 where off-hook is detected. Off-hook is detected in the preferred embodiment at subscriber line circuit 251 (FIG. 2). Subscriber line circuit 251 notifies processor 225 by sending an interrupt, or alternatively by sending a message on system bus 235. Processing proceeds to box 302 where switch 100 is notified, by the processor 225 sending a message via ICC 240 to the switch, requesting dial tone. Dial tone is provided by the switch through ISDN bus 220 to telephone 126. Processing continues to box 303 where the audio ringing codec filter 253 is configured by processor 225 to receive dial tone and pass dial tone to telephone 126. This includes notifying audio ringing codec filter 253 of the selected B-channel.

Processing proceeds to box 304 where digits are collected at DTMF receiver 252 from telephone 126. Digits are then sent to processor 225. Processing proceeds to box 305 where processor 225, sends the digits received from telephone 126 to switch 100 via messages formatted and sent from ICC 240.

Processing proceeds to decision diamond 306 where a determination is made if the call has been completed. If the call has not been completed, then in decision diamond 307 subscriber line circuit 251 is checked to determine if telephone 126 is now on-hook. If telephone 126 is not on-hook then processing returns to decision diamond 306. If telephone 126 is on-hook in decision diamond 307, then in box 310 processor 225 notifies switch 100 that the call has been abandoned and processing ends at 311.

If, in decision diamond 306, the call is completed, processing continues to box 308 where the call state for telephone 126 is set to busy in the internal table of processor 225. Processing proceeds to decision diamond 304 where a determination is made by processor 225 if telephone 126 is on-hook. If telephone 126 is on-hook, then processor 225 notifies the switch of call termination in box 310, processor 225 updates its internal table, and processing ends at circle 311.

If telephone 126 is not on-hook in decision diamond 309, then processing proceeds to decision diamond 312 where a determination is made if a termination message has been received at ICC 240 from switch 100. If a termination message has not been received, then processing proceeds back to decision diamond 309. If a termination message has been received in decision diamond 312, processing proceeds to decision diamond 313 where a determination is made if telephone 126 is on-hook. If telephone 126 is on-hook then processing ends in circle 314. If telephone 126 is not on-hook, processing waits at decision diamond 313 for on-hook. Alternatively, after a predetermined period of time, processor 225 could cause audio ringing codec filter 253 to generate tones to notify the user to return the handset to the cradle.

Figure 4:
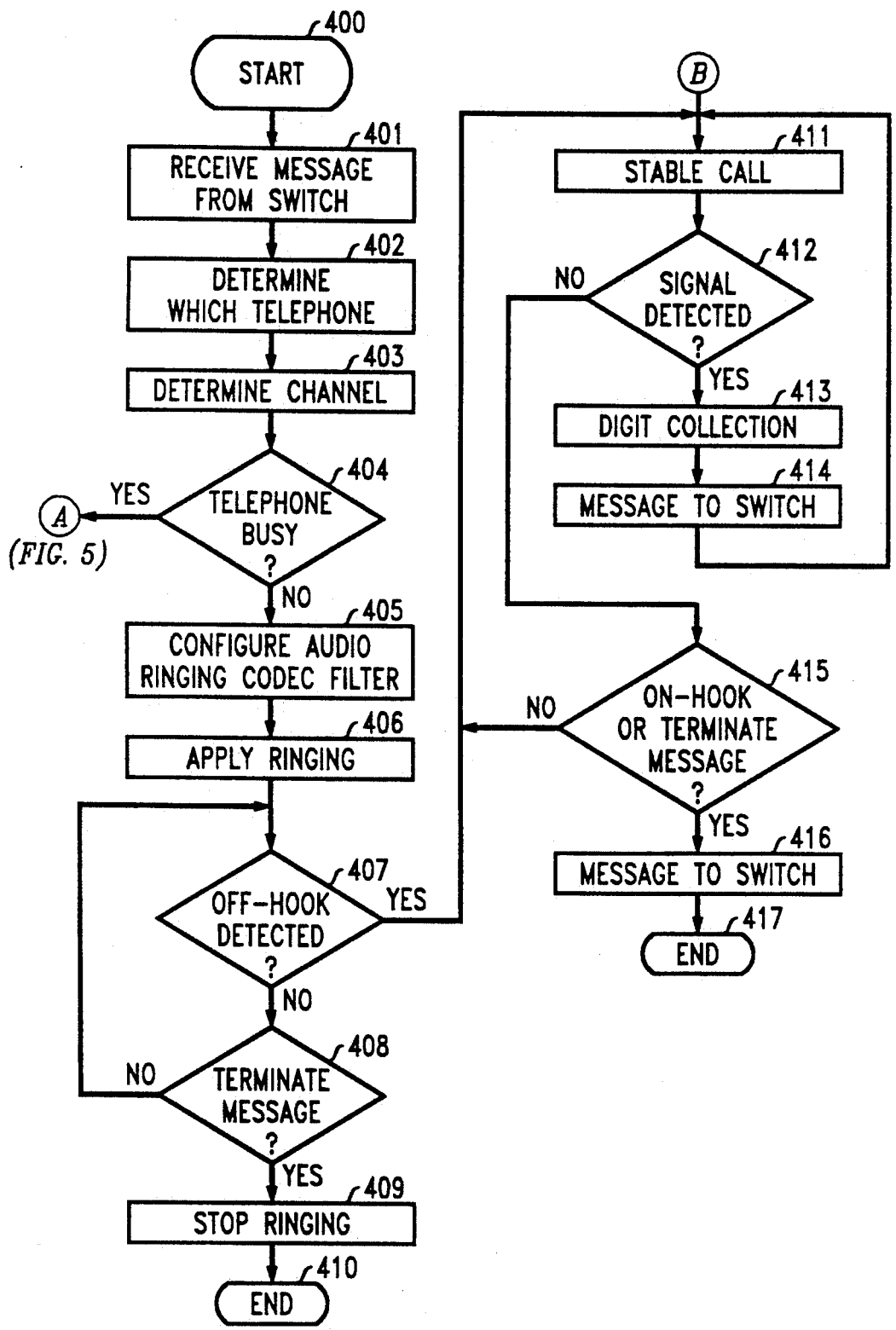
FIG. 4 is a flow chart describing the program control of the voice/data controller of FIG. 2 for incoming call treatment.

Turning now to FIG. 4, a flow chart of processing when a call is terminated to one of the telephone station sets connected to voice/data controller 200. Processing begins in circle 400 and proceeds to box 401 where a message is received at ICC 240, indicating a call origination to one of the telephones connected to voice/data controller 200. Processing proceeds to box 402 where a determination is made as to which telephone is the destination telephone. Processing proceeds to box 403 where a determination is made as to which B-channel the incoming call is on. Processing then proceeds to decision diamond 404 where a determination is made as to whether the destination telephone is busy. If the destination telephone is busy, then processing continues through connector A, FIG. 5.

If in decision diamond 404 the destination telephone is not busy, then processing proceeds to box 405 where the appropriate audio ring codec filter 253 is configured to receive data from the proper B-channel then translated to analog audio signals. Processing continues to box 406 where ringing is applied by processor 225, connecting power ringing circuit 202 to the subscriber line circuit 251.

Processing proceeds to decision diamond 407 where a determination is made it off-hook has been detected at subscriber line circuit 251. If off-hook has not been detected, then processing proceeds to decision diamond 408 where determination is made whether a termination message has been received from switch 100, indicating that the dialing party has abandoned the call. If not, processing returns to decision diamond 407. If a termination message was received in decision diamond 408, then processing proceeds to box 409 where ringing is removed from subscriber line circuit 251 and processing ends at 410.

If in decision diamond 407 off-hook is detected, then processing proceeds to box 411 where stable call is established, including updating the processor's internal table. Processing continues to decision diamond 412 where determination is made if signaling has been detected, either from telephone station set 126 or alternatively from a message received from switch 100. If signaling has been detected in decision diamond 412, then processing proceeds to box 413 and digits are collected from telephone station set 126 at DTMF receiver 256, as is known in the art. Alternatively, processor 225 takes action as appropriate. Processing continues to box 414 where a message is sent to switch 100, indicating either acknowledgement of the message from the switch, or requesting features. In the case of request for features, switch 100 would be requested to place the first call on hold and receive digits for a second call. Alternatively, switch 100 could be requested to bridge, as would be the case if there are currently one call on hold and one call active. Both of these cases are known in the art and will, therefore, not be described further. Processing then continues back to box 411 where a stable call is recorded.

If signaling is not detected in decision diamond 412, then a determination is made in decision diamond 415, whether on-hook has been detected at subscriber line circuit 251. If on-hook is not detected, then processing returns to box 411. If on-hook has been detected in decision diamond 415, then processing continues to box 416 where a termination message is sent to switch 100. The call is torn down by processor 225 and processing ends at 417.

Figure 5:
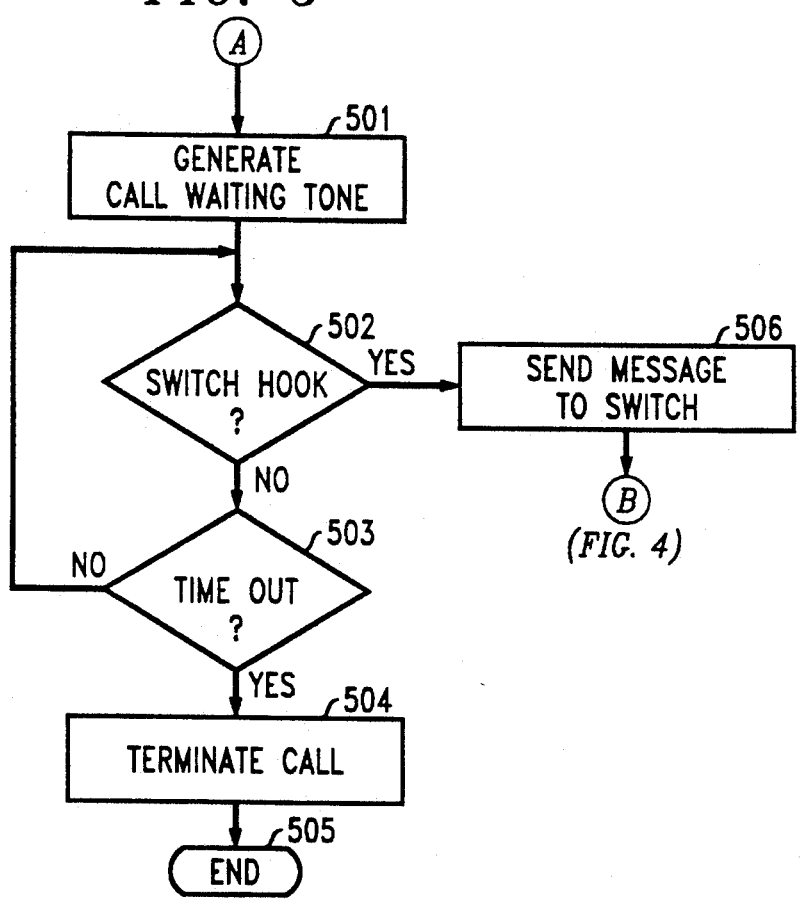
FIG. 5 is a flow chart describing the program control of the voice/data controller of FIG. 2 for call waiting treatment.

FIG. 5 describes the program control for a call waiting scenario. Processing enters through connector A and proceeds to box 501 where processor 225 causes audio ringing codec filter 253 to produce a call waiting tone. Advantageously, the call waiting tone is a distinctive tone or tones depending upon the telephone number dialed by the calling party. Processing continues to decision diamond 502 where a determination is made if a switch hook signal has been received. The switch hook signal is the standard response from an analog station set such as 126 to instruct the switch to put one call on hold and receive the call waiting. Switch hook would be received at subscriber line circuit 251, and communicated to processor 225. If switch hook is not received, then a determination is made in decision diamond 503 whether the call waiting process has timed out. If it has not timed out, then processing proceeds to decision diamond 502. If the call waiting timed out in decision diamond 503, then processing proceeds to box 504 where a termination message is sent to switch 100 via ICC 240. This branch ends at 505. If a switch hook signal is detected in decision diamond 502, then processing proceeds to box 506 where a message is sent to the switch. This message would indicate to the switch to put the first call on hold, and deliver digital data representing the second call to voice/data controller 200. Processing then continues to connector B, FIG. 4.

Figure 6:
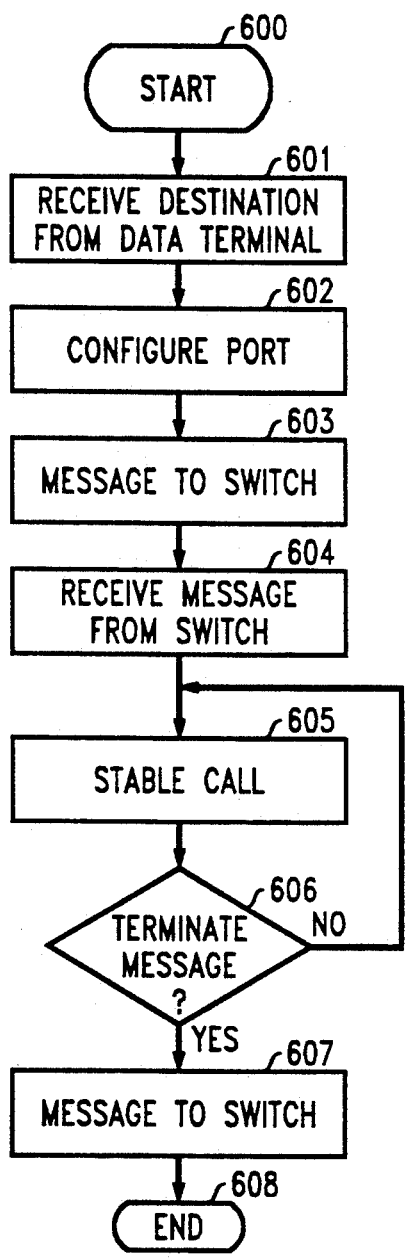
FIG. 6 is a flow chart describing the program control of the voice/data controller of FIG. 2 for a data call.

FIG. 6 describes program control for a data connection from a data terminal, for example 130 to a remote destination. Processing starts at 600 and proceeds to box 601 where serial communication controller 271 receives a message from data terminal 130, indicating a communication request. Processing continues to box 602 where a message is sent to processor 225, indicating a packet connection request, and, in response, processor 225 configures a serial port for data communication. Processor 225 in box 603 sends a message to switch 100 indicating a data connection and the destination number. Processing continues to box 604 where a message is received from switch 100 indicating a data connection. Processing continues to box 605 where data call is then in a stable state and packet transmission and reception takes place. Processing continues to decision diamond 606 where a determination is made if a termination message has been received from either data terminal 130 or from switch 100. If a termination message has not been received then processing continues to box 605.

If a termination message has been received in decision diamond 606, then processing proceeds to box 607 where processor 225 sends a message acknowledging a termination message from switch 100 or alternatively initiating a termination request to switch 100. Processor 225 also acknowledges or sends a termination message to data terminal 130. Processing ends at 608.

It is to be understood that the above-described embodiments are merely a illustrative principles of the invention and that any variations may be devised by those skilled in the art without departing from the scope of the invention. It is, therefore, intended that such variations be included within the scope of the appended claims.

I claim:

1. A customer premises apparatus capable of interfacing more than one analog telephone and more than one digital data terminal to a single integrated services digital network (ISDN) line connected to a telephone switching system switch that provides ISDN services, said ISDN line comprising two B-channels and a D-channel, said apparatus comprising:

a stored program control processor;

a communications controller, said communications controller communicating with said processor;

analog interface means for interfacing said more than one analog telephone to said B-channel under the control of said processor, said analog interface means receiving analog signaling indicative of requests for ISDN services from said analog telephones and forwarding said requests to said processor;

digital interface means for interfacing said more than one digital data terminal to said D-channel and said B-channels under the control of said processor, said digital interface means receiving digital signaling indicative of requests for ISDN services from said digital data terminals and forwarding said requests for ISDN services to said processor; and bus means for connecting said analog interface means, said digital interface means and said communications controller to said ISDN line, wherein said communications controller receives ISDN control messages from said switch on said ISDN line, translates said control messages and sends said translated control messages to said processor, and wherein said processor configures said analog and digital interface means responsive to said translated control messages, and wherein said communications controller receives request messages from said processor pursuant to requests for ISDN services from said analog interface means and said digital interface means, translates said messages and sends said messages on said ISDN line to said switch, thus providing ISDN services to said more than one analog telephone and said more than one digital data terminals.

2. An apparatus according to claim 1 further including a U-interface for interfacing said bus means to said ISDN line.

3. An apparatus according to claim 1 further including memory means for storing a control program for controlling said processor.

4. An apparatus according to claim 3 further including update means connected to said memory means for changing the contents of said memory means.

5. An apparatus according to claim 4 wherein said update means comprises a card reader for reading electronically encoded memory cards.

6. An apparatus according to claim 1 wherein said analog interface means comprises
coding and decoding means for converting digital data from said B-channels into analog signals for said analog telephones and analog signals from said analog telephone into digital data for said B-channels.

7. An apparatus according to claim 1 wherein said analog interface means comprises:
means for detecting on-hook and off-hook transitions of said analog telephone; and
means for providing electricity to said analog telephone.

8. An apparatus according to claim 1 wherein said analog interface means comprises
means for detecting dual-tone, multi-frequency (DTMF) signals from said analog telephone and reporting detected DTMF signals to said processor.

9. An apparatus according to claim 1 wherein said analog interface means comprises
means for generating audible tones for said analog telephone.

10. An apparatus according to claim 1 wherein said digital interface means comprises a serial communications controller for interfacing to a serial port of said digital data terminals.

11. An apparatus according to claim 1 wherein said digital interface means comprises two data ports for connecting to said digital data terminals.

12. An apparatus according to claim 1 further including means for providing electrical power to said analog telephones when local power supply is interrupted.

13. An apparatus according to claim 12 wherein said means for providing electrical power comprises a rechargeable battery.

14. A customer premises apparatus capable of interfacing more than one analog telephone and more than one digital data terminal to a single integrated services digital network (ISDN) line connected to a telephone switching system that provides ISDN services, said apparatus comprising:
a stored program control processor;
a system bus connected to said processor;
an ISDN bus connected to said ISDN line;
analog interface means, connected to said system bus and to said ISDN bus, for interfacing said more than one analog telephone to said ISDN bus and being configurable by said processor via commands sent over said system bus, said analog interface means adapted to receive analog signaling indicative of requests for ISDN service from said analog telephones and forward said requests to said processor via said system bus, said analog interface means also adapted to receive digital data from said ISDN bus, translate said data into analog signals, and deliver said analog signals to said more than one analog telephone, and further adapted to receive analog signals from said more than one analog telephone, translate said analog signals into data and deliver said data to said ISDN bus;
digital interface means, connected to said system bus and to said ISDN bus, for interfacing said more than one digital data terminal to said ISDN bus and being configurable by said processor via commands sent over said system bus, said digital interface means adapted to receive digital signaling indicative of requests for ISDN services from said digital data terminals and forward said requests for ISDN services to said processor over said system bus, said digital interface means also adapted to receive digital data from said ISDN bus and deliver said data to said more than one digital data terminal, and further adapted to receive data from said more than one digital data terminal and deliver said data to said ISDN bus; and
a communications controller connected to said ISDN bus and to said system bus for receiving ISDN control messages from said switch on said ISDN bus, translating said control messages and sending said translated control messages to said processor over said system bus, wherein said processor configures said analog interface means and said digital interface means responsively to said control messages, and for receiving request messages from said processor over said system bus pursuant to requests for ISDN services from said analog interface means and said digital interface means, translating said messages and sending said messages on said ISDN line, thus providing ISDN services to said more than one analog telephone and said more than one digital data terminals.

* * * * *